UNITED STATES PATENT OFFICE.

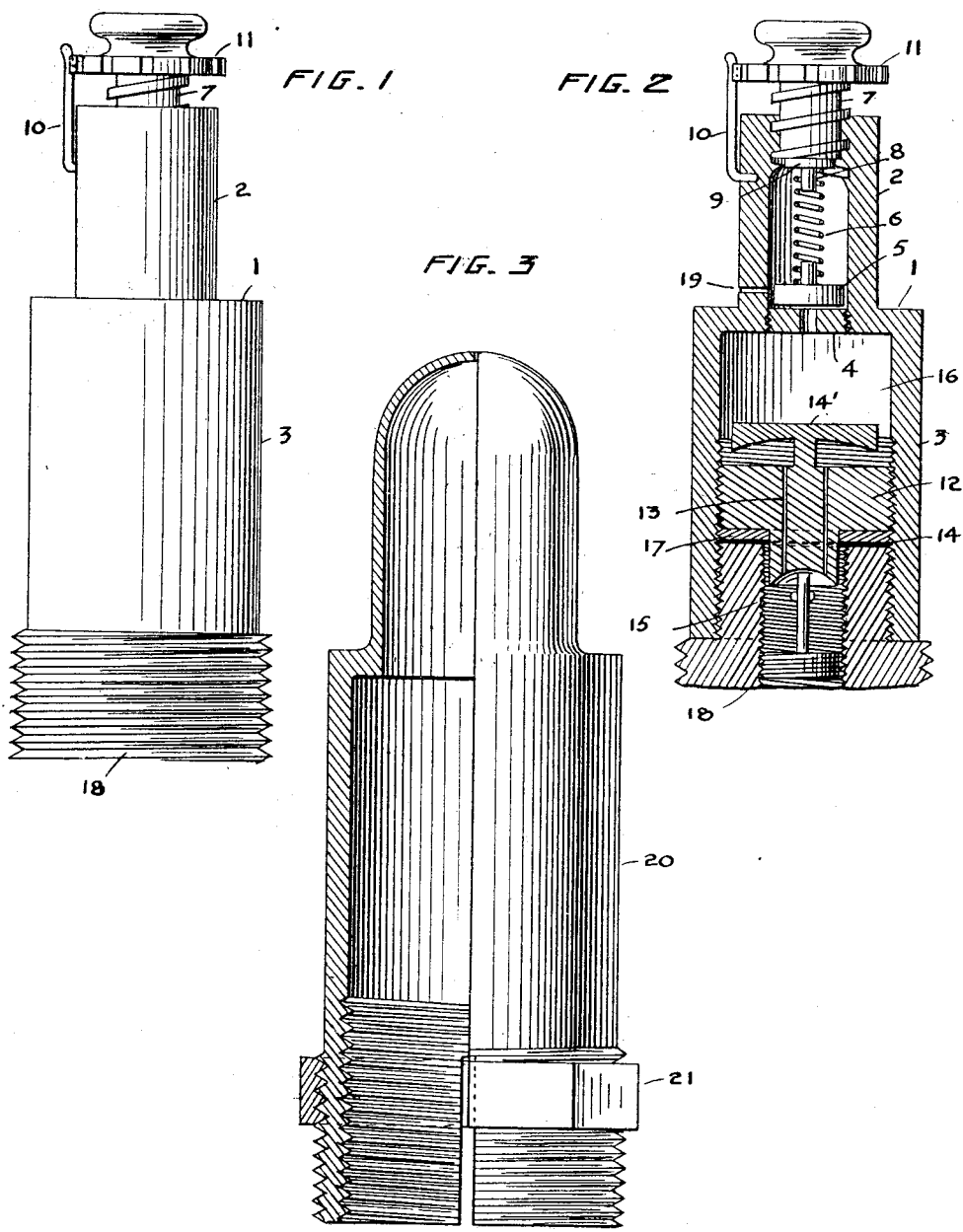

EDWARD W. SHEWMAKER, OF SAN FRANCISCO, CALIFORNIA, ASSIGNOR OF TWENTY ONE-HUNDREDTHS TO MICHAEL D. LAWLER AND TWENTY ONE-HUNDREDTHS TO WM. B. SCHLOTTMAN, BOTH OF SAN FRANCISCO, CALIFORNIA.

SAFETY-VALVE FOR TIRES.

1,179,668.  Specification of Letters Patent.  Patented Apr. 18, 1916.

Application filed October 3, 1914. Serial No. 864,773.

*To all whom it may concern:*

Be it known that I, EDWARD W. SHEWMAKER, a citizen of the United States, residing at San Francisco, in the county of San Francisco, State of California, have invented a new and useful Safety-Valve for Tires, of which the following is a specification in such full and clear terms as will enable those skilled in the art to construct and use the same.

This invention relates to a safety valve for tires and its object is to provide means whereby the pressure in a pneumatic tire may be held below a given amount, notwithstanding the fact that the pressure in the tire may be increased by heating due to fast traveling or from other causes.

Another object of the invention is to provide a valve which will be slow enough to act to prevent the pressure in the tire from being reduced too low due to the increases in pressure therein because of striking bumps or chuckholes.

An embodiment of the invention is shown in the drawing in which the same reference numeral is applied to the same portion throughout, but I am aware that there are many modifications thereof.

Figure 1 is a side elevation of the device as it appears when attached to the valve pipe of a pneumatic tire, the cover therefor being removed, Fig. 2 is a vertical sectional view through the safety valve and showing the cover therefor also in section, and Fig. 3 is a side elevation of the cover with a portion thereof broken away.

The numeral 1 represents a casing having a small cylindrical portion 2 and a larger cylindrical portion 3. Between the two portions, each of which is bored, is a partition 4 having a hole therein and upon which partition a valve 5 loosely fitting within the bore of the partition 2 seats. A spring 6 is seated upon the top of said valve and bears on the underside of an adjusting plug 7. The plug 7 has an extension 8 which passes within the spring 6, and a washer 9 prevents the spring from being twisted when the plug is screwed in or out.

On the side of the part 2 a spring 10 is brazed which spring bears upon the edge of a flange 11 on the plug 7, said flange being suitably notched to hold the plug in any desired adjustment. The plug 7 has steep threads as indicated and the top of the flange is suitably numbered to indicate the desired pressure.

Screwed within the enlarged portion 3 is a plug 12. This plug has two small openings 13 and 14 therethrough, which openings terminate under a concaved flange 14'; said flange being an integral part of the plug 12. The plug is provided with a rounded surface 15 which bears upon the valve stem and permits the air pressure to be passed into the air chamber 16 and against the underside of the valve 5.

A gasket 17 is used to insure a tight joint between the plug 12 and the top of the valve pipe 18. The air escapes from the upper portion of the safety valve through a small opening 19. In order to protect the safety valve a cover cap 20 having an opening 22 in the top thereof is screwed on the outside of the valve pipe 18, a lock nut 21 being used to secure the cap in place.

The operation of the device is as follows: When the safety valve is screwed on the valve pipe the usual valve stem is depressed, pressure is thereupon put upon the underside of the valve 5 and by the adjustment of the plug 7 the user is assured against having too high a pressure in the tire, but in order to prevent sudden shocks from causing the loss of air in the tire the openings 13 and 14 are made very small and terminate under the flange 14' so that when the car strikes a bump causing an increase of pressure in the tire the increased pressure will cause the air to pass through the openings 13 and 14, but a jet of air will strike on the underside of the flange 14' and thus be retarded sufficiently to prevent any undue loss of air after it has expanded as much as it may in the chamber 16 above the flange 14'.

Having thus described my invention what I claim as new and desire to secure by Letters Patent of the United States, is as follows, modifications within the scope of the claims being expressly reserved:

A safety valve for separate attachment to an ordinary pneumatic tire valve stem comprising a cylindrical portion provided with internal screw threads adapted to be attached to the end of a valve stem, a plug screwed into said cylindrical portion above the valve stem, said plug having an opening therethrough and carrying an extension to unseat the valve in the valve stem and having a shield above the opening through the plug, and means to retain a given pressure in the tire when the tire valve has been unseated.

In testimony whereof I have hereunto set my hand this 12th day of September, A. D. 1914, in the presence of the two subscribed witnesses.

EDWARD W. SHEWMAKER.

Witnesses:
C. P. GRIFFIN,
M. D. LAWLER.